Figure 1:
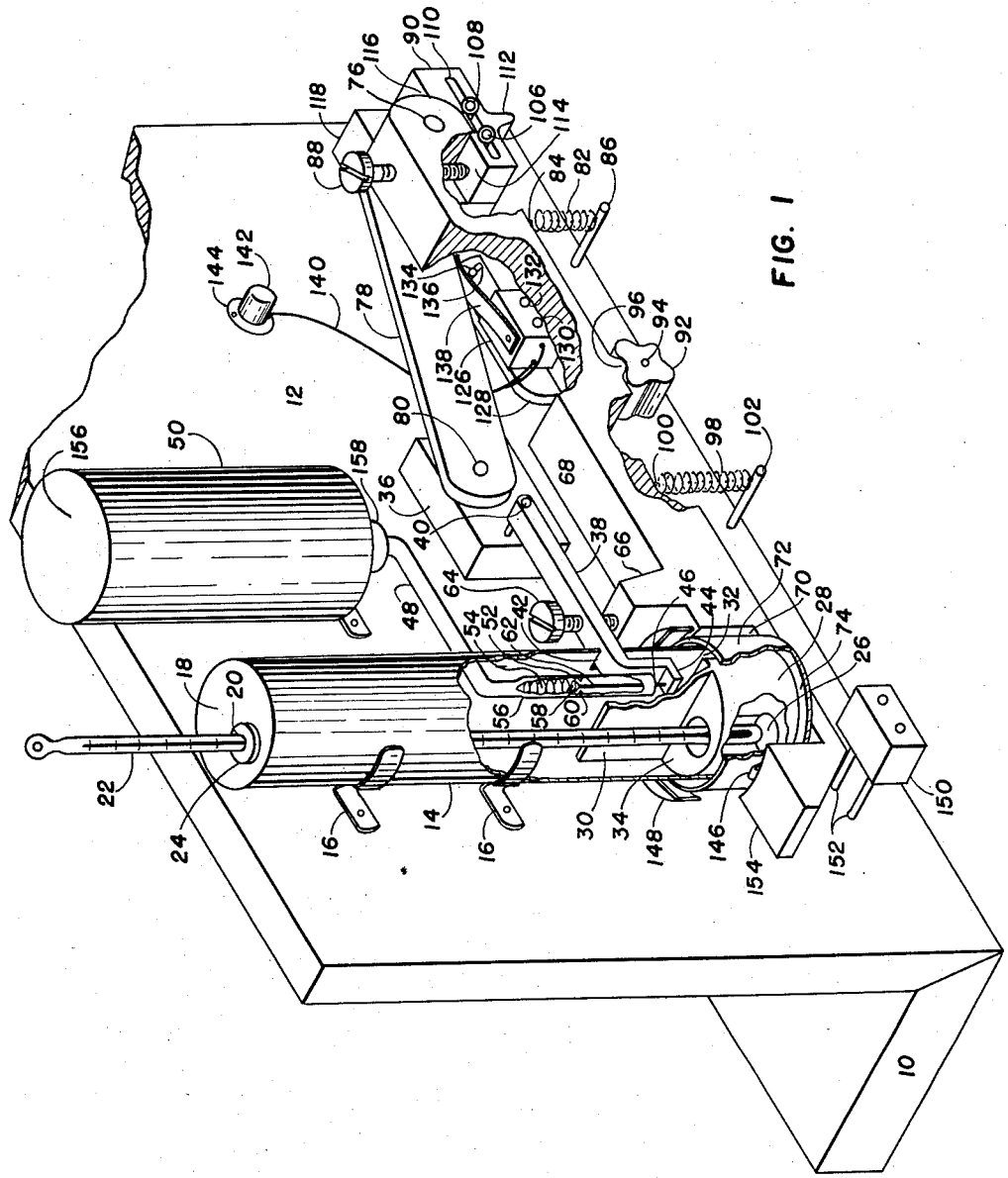

Sept. 15, 1959  C. C. HULBERT  2,903,882
FREEZING POINT TESTER

Filed Oct. 15, 1956  3 Sheets-Sheet 1

INVENTOR.
CHARLES C. HULBERT
BY
Edward N. Long
ATTORNEY

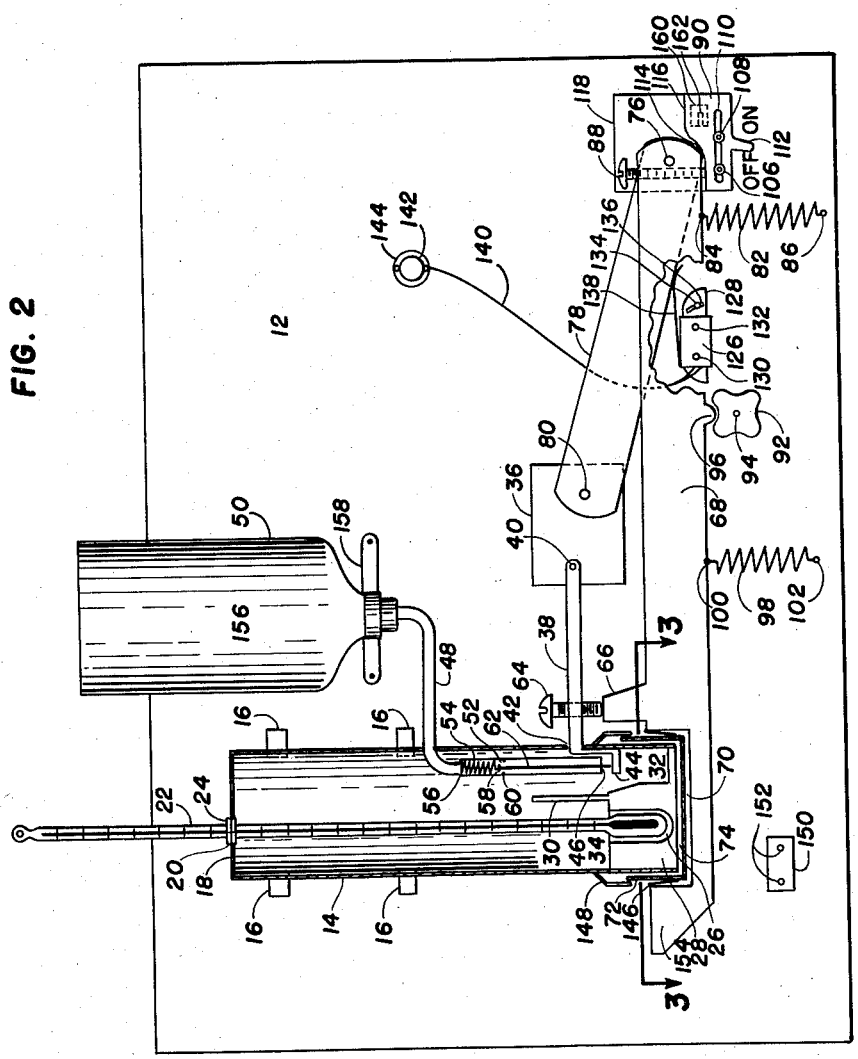

Sept. 15, 1959     C. C. HULBERT     2,903,882
FREEZING POINT TESTER

Filed Oct. 15, 1956                               3 Sheets-Sheet 3

INVENTOR.
CHARLES C. HULBERT
BY
*Edward H. Lang*
ATTORNEY

United States Patent Office 2,903,882
Patented Sept. 15, 1959

1

2,903,882

FREEZING POINT TESTER

Charles C. Hulbert, Beaumont, Tex., assignor to The Pure Oil Company, Chicago, Ill., a corporation of Ohio Application October 15, 1956, Serial No. 615,926

15 Claims. (Cl. 73—17)

This invention relates to an apparatus for determining the freezing point of liquids and, more particularly, to an apparatus in which the amount of sample and refrigerant used is small and the formation of crystals controls the extent of refrigeration applied and automatically maintains the system in equilibrium so that the exact temperature of crystal formation can be recorded and studied.

Devices for the determination of the freezing point of liquids are known. However, the prior art devices have several disadvantages. The amount of sample used or needed is relatively large and the time consumed in reaching the crystallization point is unduly long. The amount of refrigerant necessary is high and the temperature of initial crystallization is often passed before the thermometer reading accurately reflects the temperature because the rate of cooling is high and erratic. Prior art devices also provide little or no agitation and require the continuous attention of the operator and his good judgment and skill in interpreting the results. Where the automatic principle is used, the temperature indicating mechanism is made to depend on the degree of crystallization, which because of sample size, does not exert a uniform mechanical impedance or frictional force to give a uniform temperature reading. Although variations in the amount of refrigerant are permitted, permitting repetition of the tests for comparison, the devices are of such design that such variation exposes the device to mishandling and errors of judgment. Some solutions may change composition during crystallization, as alcohol solutions, where the solid phase has a much lower alcohol content than the remaining liquid phase. If such a device is designed so that the temperature sensing unit and the cooling unit are in spaced relationship, the point of solidification is not representative of the original sample and may have a considerably lower freezing point than the whole sample. This invention is directed to a device which eliminates these disadvantages and minimizes the human error.

Accordingly, it is a primary object of the invention to provide an improved apparatus and method for determining the freezing point of liquids.

Another object of the invention is to provide an apparatus for determining the freezing point of liquids wherein the freezing solution is kept in constant agitation and the extent of crystal growth controls the rate of temperature lowering and the equilibrium temperature of solid-to-liquid can be ascertained and recorded.

Another object of the invention is to eliminate the need for a thermally responsive element within the freezing solution or liquid whereby more accurate freezing point determinations can be made.

Still further, another object of the invention is to provide an apparatus for determining freezing points of liquids wherein the temperature observation is facilitated and the heat exchange or heat removal by the refrigerant is uniform and gradual.

The attached drawing illustrates a preferred embodiment of the invention wherein the apparatus is shown:

In Figure 1 as an isometric view with portions thereof cut-a-way to show certain details.

In Figure 2 as a fragmentary view a front elevation with portions thereof shown in vertical cross-section.

Figure 3:
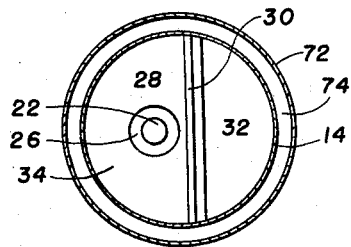

In Figure 3 as a cross-sectional view taken along that portion of the device indicated at lines 3—3 of Figure 2 showing the details of the sample container and refrigerant zone.

Figure 4:
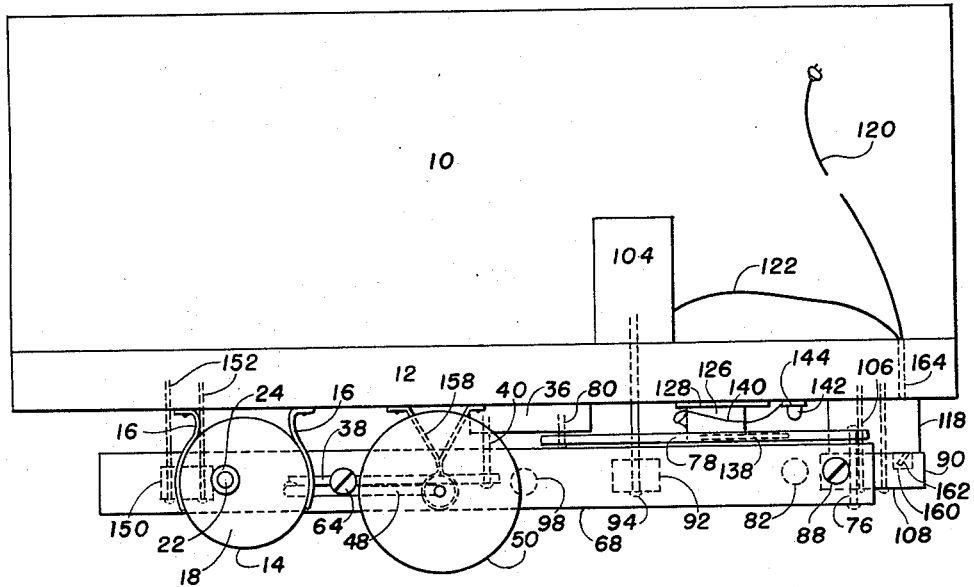

In Figure 4 as the top plan view of the device shown in Figure 1.

Referring to the drawings, the relationship of the various mechanical parts will first be described followed by an explanation of their operation. The apparatus is supported by base member 10 and upright member 12. A tubular or cylindrical metal tube 14 is attached to upright 12 by means of brackets 16. Metal tube 14 is closed by top 18 which seals the tube 14 except for opening 20 through which thermometer 22 is fitted in sealed relationship by means of rubber grommet 24. The lower end or bulb of thermometer 22 rests within well 26 of metal block 28, which forms the sealed bottom of tube 14. Partition 30 extends transverse the bottom of tube 14 to separate the lower portion thereof into a refrigerating zone 32 and a temperature detecting zone 34. Supporting block 36, affixed to upright 12, carries lever 38 at pivot point 40. Lever 38 protrudes through aperture or slot 42 in the lower wall of tube 14 and extends downwardly to form shoulder 44 just beneath the opening 46 in tube 48 communicating with refrigerant container 50 and controlled by valve 52. Valve 52 within tube 48 has spring 54 depending against shoulder 56 to hold valve bulb 58 against valve seat 60 in such a manner that the upward movement of lever 38 raises rod 62 and unseats the valve bulb 58 from valve seat 60. Adjusting screw 64 is threaded within lever 38. The lower end of adjusting screw 64 rests against and is in operable engagement with projection 66 of lever 68. Lever 68 contains recess 70 in which is fitted cup 72 containing the liquid sample 74, the freezing point of which is to be tested. Lever 68 is pivotally mounted at point 76 to secondary lever 78 which in turn is pivotally mounted at point 80 to block 36 attached to upright 12. Spring 82 is attached to lever 68 at pin 84 and to upright 12 at pin 86 holding lever 68 and the bottom of adjusting screw 88, which is threaded within lever 68, against switch block 90 and against four-lobed clock driven cam 92 driven by shaft 94 operating against shoulder 96. A second spring 98 is attached to lever 68 at pin 100 and to upright 12 at pin 102. Switch block 90 controls the electric power to an electric clock motor 104 located on the back side of upright member 12 (see Figure 4) and operates at about 1 r.p.m. Motor 104 drives cam 92 through shaft 94.

Switch block 90 is slidably supported on spaced supports 106 and 108 operating within slot 110. Supports 106 and 108 attach through switch 118 to upright 12. Handle 112 facilitates the movement of switch block 90. The upper surface of switch block 90 has recess 114 and raised cam surface 116 upon which screw 88 and the pivoted end of lever 68 rests and may be caused to be raised and lowered by the movement of switch block 90. Switch 118 illustrates a single-pole, single-throw toggle switch located behind and slidably supporting switch block 90 wherein recess 160 engages toggle arm 162, which action turns switch 118 on and off. With switch block 90 in "On" position as shown, switch 118, see Figure 4, is connected through lead 120 to power source (not shown) to motor 104 by means of lead 122.

Micro switch 126 is mounted to upright 12 by means of bracket 128 and screws 130 and 132 in cooperation with screw 134 operating in slot 136. Screw 130 passes through micro switch 126 and through bracket 128 into upright 12. Screw 132 fastens to bracket 128 only. Screw 134 passes through slot 136 in bracket 128 and attached to upright 12. Switch lever 138, serving to actuate the micro switch, extends underneath lever 78 and is in slidable contact with the underside thereof. Electrical line 140 leads from micro switch 126 to signal light 142 supported on upright 12 as by bracket 144. Correct contact of switch lever 138 with lever 78 is obtained by sliding switch block 90 to "On" position as shown, adjusting screw 88 for proper contact of sample cup 72 with cooling tube 14, loosening screws 130 and 132, rotating bracket 128 and micro switch 126 about screw 130 until signal light 142 is off. This adjustment is made so that signal light 142 will go on with a very slight upward movement of lever 78 as would occur when crystal formation prevents sample cup 72 from rising around tube 14 and the upward movement of lever 68 is thereby transferred to the other side of shoulder 96. Screws 130 and 132 are then tightened. Signal light 142 will then flash about every 15 seconds after freezing of the sample occurs.

Sample container 72 is held within recess 70 of lever 68 by means of friction spring clips 146. Metal skirt 148 surrounds and is attached to tube 14 and overlaps but is spaced from the top edge of sample container 72. Skirt 148 prevents condensed water vapor, cooling on the outside of tube 14, from running into the sample container 72. Block 150, which may be a small permanent magnet, is attached to upright 12 by means of supports 152 and forms a rest or holding means for the end of lever 68 when same is forced down by hand pressure at point 154.

The refrigerant liquid is represented by 156 within container 50, which latter is held to upright 12 by means of bracket 158. Bracket 158 may incorporate a threaded seal-puncturing cap which permits a full container (50) of refrigerant to be placed therein upon depletion of the container in use by merely removing the empty container and turning the spout of the full container into bracket 158.

Under the pressure of springs 82 and 98, shoulder 96 of lever 68 is maintained in contact with cam 92. The relative sizes of recess 70, sample container 72, and the clearance of skirt 148 with the side of the sample container are such that the sample container is easily placed therein and removed therefrom. Through the action of spring clips 146 sample container 72 when in place is held in a fixed position. The up and down motion of lever 68 does not cause the sample container 72 to strike skirt 148 or the sides of metal container 14, except to bring the inner bottom surface of container 72 against the bottom of container 14.

In Figure 3 a cross-section of the sample container 72 and the bottom portion of container 14 are shown, taken along line 3—3 of Figure 2, to bring out the concentric arrangement of sample container 72 and the outer wall of tube 14 with the liquid sample 74 therebetween, whereby the refrigerating zone 32 and metal block 28 are surrounded by liquid sample 74. The arrangement of thermometer well 26 within metal block 28 to accommodate thermometer 22 is shown. Partition 30 extends across the inner part of tube 14 to separate refrigerating zone 32 from temperature detecting zone 34. The inside diameter of sample container 72 exceeds the outside diameter of tube 14 by 20 to 30%. Tube 14 will occupy the maximum of 50% of sample-cup volume.

Figure 4 further illustrates the relationship of the various parts just described. Electrical leads 120 and 122 pass in insulated relationship through aperture 164 in upright 12. Instead of mounting tube 14 and refrigerant container 50 upon the brackets as shown, same may be embedded within upright 12, which construction would allow the relocation of switch 118 and shorter support means for switch block 90, springs 82 and 98, and block 150. Tube 48 is preferably a capillary tube which is firmly brazed or soldered to bracket 158 and to the wall of container 14.

The operation of the device is as follows: Switch block 90 is moved to the left or "Off" position, so that cam 92 is stationary. This moves surface 114 under the bottom of screw 88 and raises this end of lever 68 slightly and lowers the sample-holding end a corresponding amount through spring 98, to bring projection 66 of lever 68 out of contact with screw 64, permitting valve 52 to close regardless of the position at which cam 92 stops. Lever 68 is then pressed down at 154 by hand so that its bottom surface rests on block or magnet 150. Sample container 72 is removed, filled with about 15 to 20 drops of liquid to be tested (74) and replaced within spring clips 146. Forcing lever 68 down causes the bottom surface of the lever to slide along the cam 92, raises the opposite end of lever 68 against spring 82 and the assembly pivots around pinion 80. Secondary lever 78 rotates counter-clockwise around pinion 80 in this operation. Lever 68 is then allowed to go back into position so that the bottom of tube 14 immerses in the sample 74 and the sample liquid-level rises to a point about mid-way on the sides of container 72. Switch block 90 is moved to the right or "On" position, which starts the electric motor 104 and cam 92. This also permits projection 66 of lever 68 to encounter screw 64 and raise lever 38 whenever cam 92 comes into position with a lobe under projection 96 of lever 68. Screw 64 is adjusted so that when lever 68 is in its upper position as determined by the motion of cam 92, valve 52 is opened slightly through rod 62 and when in its lower position, valve 52 is closed, through the action of spring 54, the interval allowing a small amount, about 2 to 4 drops of refrigerant 156 to escape through line 48 into refrigerating chamber 32. Cam 92 turns at about 1 r.p.m., one of its four lobes encountering shoulder 96 of lever 68 each 15 seconds. This action turns lever 68 clockwise about pivot 76, raising sample container 72 until its bottom encounters the bottom of tube 14 and simultaneously forces valve 52 to open position.

Evaporation of the refrigerant liquid 156, such as Freon, in chamber 32 cools the bottom of tube 14. Each moment of release of refrigerant will cool the sample 74 about 5° to 6° F., or about 22° per minute. The mass of metal in metal block or bottom 28 provides thermal inertia to permit thermometer 22 to sense the temperature of the tube 14 and sample 72 rather than the temperature of the evaporating refrigerant. When the freezing point of the sample is reached after a number of revolutions of cam 92, crystals of frozen sample 74 will begin to form against the outside of the bottom of tube 14. Because of the relatively close location of the sample container 72 with the bottom of tube 14, this crystal formation, even while still small, will prevent the full upward movement of lever 68 and reduce the motion of lever 38, causing a proportionate reduction in the volume of refrigerant liquid 156 released for each 15 second cooling cycle. The formation of a small amount of crystals causes an alteration in the motion of lever 68, that is the clockwise motion of the lever around pivot point 76 will be reduced and transformed into a slight counterclockwise motion about pivot 80 through the action of secondary lever 78. As the crystal growth progresses, this change in motion becomes more pronounced. The point of first change in motion of levers 68 and 78 is sensed by arm 138 of micro switch 126 and a sginal is transmitted to light 142. This signal may also be used to automatically record the freezing temperature. The freezing point may be observed without the use of micro switch 126 by noticing the first tapping of screw 88 on surface 114. Since this action simultaneously reduces the amount of refrigerant, the temperature remains constant and the freezing point can be accurately determined. If the device is so adjusted that the rate of reduction of refrigerant release is such that freezing continues slowly, there will be very little change in temperature as more crystals form and the heat reduction will be no more than is necessary to form the additional crystals. Even if crystal formation progresses to the point where any upward movement of the lever 68 and the sample container 72 is stopped, cam 92 may continue to turn and lever 68 will resume the clockwise movement when the crystals melt sufficiently to permit such movement. Any substantial reduction in crystal volume in sample container 72 will permit sufficient movement of lever 68 and lever 48 to begin opening valve 52 again on each cycle and prevent the sample temperature from rising above the freezing point. In general, once the sample temperature has been lowered to the freezing point, this temperature will be maintained substantially constant automatically as long as the device is allowed to operate.

Various refrigerants such as liquid ammonia, carbon dioxide, sulfur dioxide, butane and other hydrocarbons, carbon disulfide, carbon tetrachloride, ethyl ether, difluorodichloromethane, methyl chloride, may be used. Choice of the refrigerant depends on the availability and freezing points or temperatures desired or contemplated.

Evidence that the freezing point of the sample has been reached is the momentary occurrence of clearance between the lower end of adjusting screw 88 and surface 114 of switch block 90. There will be a slight tapping noise at the end of each 15 second cooling cycle from screw 88 coming to rest again on surface 114. During each cooling cycle at the instant of maximum elevation of lever 68 by a lobe of cam 92 screw 88 will still rest on surface 114 of switch block 90 up to the time crystals form. Thereafter, the cam will raise lever 68 and screw 88 will leave surface 114 on each cycle and produce a signal to light 142 and a tapping noise when screw 88 returns to surface 114.

The apparatus is fabricated of ordinary materials of construction and requires very little maintenance. Once it is adjusted, no further changes in the screw setting need be made in testing liquid of different freezing points. Different types of thermometers may be used to accommodate various ranges in freezing temperatures. In place of a thermometer there may be used any of the various types of electrical temperature sensing devices available to indicate the temperature on a meter or for recording on a moving tape. Socket 144 may be a Dialco type C-431. Lamp 142 may be a 3 watt, 115 v. Dialco type 356. Micro switch 126 may be a Minneapolis-Honeywell Type w, S.P.D.T. 10 a. 125 v. switch. Sample container 72 and the block 28 may be constructed of plastic or ceramic material and should be corrosion resistant Instead of using recess 160 in the back side of switch block 90 to move toggle lever 162, as illustrated in Figures 2 and 4, other mechanical linkages may be used. Recess 160 may be replaced by spaced projecting pins located so as to move toggle lever 162 from side to side as switch block 90 is moved. Another construction would be to use a microswitch like 126 in place of toggle switch 118 and mount same in "normally open" position under lever 78 in such a manner that its activating lever, like 138, is adjusted so that only a gross upward movement of lever 78 would open the microswitch contacts. Such gross upward movement of lever 78 would result either from moving switch block 90 to the "Off" position or from moving end 154 of lever 68 down against stop 150.

The method of this invention is very simply carried out by confining a liquid sample in a sample container or sample zone, and maintaining a refrigerating zone in contact with the liquid sample. The refrigerating zone is continuously cooled so that the temperature of the liquid sample gradually falls. During this time, the zone of contact between the refrigerating zone and the liquid sample is continuously oscillated or moved so that the refrigerating zone is intermittently immersed and withdrawn from the liquid sample. The first change in the resistance of the oscillations or immersions due to the formation of crystals in the sample is detected and the temperature at which the first impedance of movement occurs is noted or recorded. The extent of crystal formation automatically reduces the rate of refrigeration as soon as there is sufficient impedance of movement of the liquid sample in relation to the refrigerating zone to be detected or bring about a mechanical change, such as the transference of the oscillation of the floating lever 68 from the sample container and to the pivotally connected end 76.

What is claimed is:
1. An apparatus for determining the freezing point of liquids comprising a source of liquid refrigerant, an enclosed refrigerating zone, means for introducing said refrigerant into said refrigerating zone, sample holding means surrounding and spaced from said refrigerating zone, means for indicating the temperature of said sample, means for raising and lowering said sample holding means so that the bottom of the refrigerating zone immersed in the liquid sample is caused to reciprocate within the liquid sample and means connected to said reciprocating means for gradually stopping the flow of refrigerant as crystals form in said liquid sample.

2. An apparatus for determining the freezing point of liquids, comprising a source of liquid refrigerant, a stationary enclosed refrigerating zone, conduit means for introducing said refrigerant into said refrigerating zone, a valve in said conduit, a first lever pivotally mounted at one end to a stationary pinion and having a second pinion connected at the other end, a second lever pivotally mounted to said second pinion at one end, said second lever having its longitudinal axis in a substantially horizontal position, sample holding means at the other end of said second lever, oscillating means for raising and lowering said second lever about said second pinion, the lower end of said refrigerating zone extending within said sample holding means and being immersed within a liquid sample contained therein, means for indicating the temperature of said sample, means attached to said second lever to open said valve when said lever is in raised position and close said valve when said lever is in lower position, whereby the formation of crystals within said sample holding means due to evaporation of said refrigerant in said refrigerating zone causes the impedance of the up and down motion of said sample holding means and transfers said motion to said second pivot point.

3. An apparatus in accordance with claim 2 in which an indicating means is attached to said second pinion and a stationary scale is associated with said indicating means so that the first oscillations of said indicating means is an indication of the first formation of said crystals in said sample holding means.

4. An apparatus for determining the freezing point of a liquid sample comprising a source of liquid refrigerant, an enclosed refrigerating zone, means for introducing said refrigerant into said refrigerating zone, a sample holding means surrounding and spaced from said refrigeration zone, means for raising and lowering said sample holding means so that said refrigeration zone immersed in the liquid sample is caused to reciprocate within the liquid sample, means for detecting the first appearance of crystals of liquid sample, means for controlling the flow of refrigerant to said refrigeration zone in proportion to the degree of reciprocation of said means for raising and lowering said sample holding means and means for indicating the temperature of said sample.

5. An apparatus for determining the freezing point of a liquid sample comprising a source of liquid refrigerant, an enclosed refrigerating zone, means for introducing said refrigerant into said refrigerating zone, means for controlling the flow of refrigerant, sample holding means surounding and spaced from said refrigerating zone, a floating lever supporting said sample holding means at one end and pivotally mounted to one end of a second lever at the other end, second lever being pivotally mounted at its other end at a point above and approximately equidistant between the ends of said floating lever, means for rapidly raising and lowering said floating lever at a point along its length such that either end of the floating lever may oscillate, means for holding said floating lever in contact with said oscillating means, means for preventing the pivotally joined ends of said levers from moving downward, means for indicating the temperature within said refrigerating zone, and means for detecting the first movement upward of said supported ends of said two levers as caused by the first appearance of crystals of said liquid sample in said sample holding means which impede the upward movement of same around said refrigerating zone, said first movement being coincidental with the freezing point of said sample.

6. An apparatus in accordance with claim 5 in which the means for controlling the flow of refrigerant to said refrigerating zone comprises a spring-actuated needle valve within a conduit leading from said source of refrigerant to said refrigerating zone, a third lever pivotally mounted at one end and in contact with the needle of said valve at the other end, and means for raising and lowering said third lever with the reciprocating movement of the sample-bearing end of said floating lever.

7. An apparatus in accordance with claim 6 in which said third lever contacts said floating lever through an adjustable means extending between said levers whereby the furthest upward movement of the sample-bearing end of said floating lever allows sufficient refrigerant to escape from said conduit to gradually lower the temperature of said sample.

8. An apparatus in accordance with claim 5 in which said refrigerating zone comprises an enclosed tubular body having a temperature detecting zone of heat conducting material and a refrigerant receiving zone in the bottom thereof separated by a partition, a thermometer well within said temperature detecting zone and means for preventing atmospheric condensate from entering said sample holding means.

9. An apparatus in accordance with claim 5 including a permanent magnet positioned in spaced relationship from the sample-holding end of said floating lever, so the latter may be held away from said refrigerating zone for replacement of said sample holding means.

10. An apparatus in accordance with claim 5 in which said floating lever has a recess in the free end thereof to receive said sample holding means and spring clips within said recess to hold said sample holding means therein.

11. An apparatus in accordance with claim 5 in which said means for holding said floating lever in contact with said oscillating means comprises a pair of spaced springs on each side of said oscillating means, said springs attaching at one end to said floating lever and at the other end to a base member supporting said apparatus.

12. An apparatus in accordance with claim 5 in which the supported pivotally connected ends of said floating lever and said second lever rest upon a cam surface of a sliding block switch, said switch being connected to a source of electrical current to operate said oscillating means, and said cam surface operating to raise the floating lever out of contact with said oscillating means.

13. An apparatus for determining the freezing point of a liquid, comprising a support for said apparatus, a source of refrigerating fluid, an enclosed refrigerating zone comprising a tubular body having a temperature detecting zone and a refrigerating zone, said temperature detecting zone comprising a body of heat transmitting material, a well within said body of heat transmitting material, temperature detecting means within said well, a valved conduit communicating between said source of refrigerating liquid and said refrigerating zone, a sample container having an open top, said sample container being in juxtaposition to said refrigerating and temperature detecting zones, a floating lever, a recess within one end of said floating lever to hold said sample container, means for oscillating said floating lever, the other end of said floating lever being pivotally attached to one end of a second lever, the other end of said second lever being pivotally attached to said support, a third lever, pivotally attached to said support and operatively engaging said valve in said refrigerating liquid conduit, said third lever being moved by the oscillating movement of said floating lever at an adjustable fulcrum, means for holding said floating lever against said oscillating means, said oscillating means being a motor-driven multi-lobed rotatable cam, means for preventing the downward oscillation of the end of said floating lever opposite said recess, and means for detecting the first upward movement of the last mentioned end of said floating lever due to the formation of crystals of said sample within said sample container.

14. The apparatus in accordance with claim 13 in which the means for detecting the first upward movement of said end of said floating lever comprises a lever-actuated micro-switch having its lever in contact with the pivotally mounted ends of said second lever and said floating lever.

15. The apparatus in accordance with claim 14 in which the micro-switch is connected to a signal lamp to give a visual indication of said freezing point.

References Cited in the file of this patent

UNITED STATES PATENTS

| | | |
|---|---|---|
| 2,437,194 | Harrington | Mar. 2, 1948 |
| 2,635,456 | Barstow | Apr. 21, 1953 |
| 2,732,709 | Dickey | Jan. 31, 1956 |